United States Patent
Yamada

(10) Patent No.: US 8,427,087 B2
(45) Date of Patent: Apr. 23, 2013

(54) CONTROL DEVICE FOR AC MOTOR

(75) Inventor: Kenji Yamada, Komaki (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 92 days.

(21) Appl. No.: 13/146,338

(22) PCT Filed: Jan. 29, 2009

(86) PCT No.: PCT/JP2009/051416
§ 371 (c)(1),
(2), (4) Date: Jul. 26, 2011

(87) PCT Pub. No.: WO2010/086974
PCT Pub. Date: Aug. 5, 2010

(65) Prior Publication Data
US 2011/0279071 A1    Nov. 17, 2011

(51) Int. Cl.
*H02P 21/00* (2006.01)

(52) U.S. Cl.
USPC .................................................. 318/400.02

(58) Field of Classification Search ............ 318/400.02, 318/503, 798, 801; 363/55
See application file for complete search history.

(56) References Cited

U.S. PATENT DOCUMENTS

| | | | |
|---|---|---|---|
| 2007/0223261 A1* | 9/2007 | Fujii et al. | 363/55 |
| 2010/0123418 A1* | 5/2010 | Itoh et al. | 318/400.02 |

FOREIGN PATENT DOCUMENTS

| | | |
|---|---|---|
| JP | 2006-101621 A | 4/2006 |
| JP | 2008-011682 A | 1/2008 |
| JP | 2008-312420 A | 12/2008 |
| WO | 2008/001524 A1 | 1/2008 |

OTHER PUBLICATIONS

International Search Report mailed Apr. 14, 2009 of PCT/JP2009/051416.

* cited by examiner

*Primary Examiner* — Walter Benson
*Assistant Examiner* — Zoheb Imtiaz
(74) *Attorney, Agent, or Firm* — Kenyon & Kenyon LLP

(57) ABSTRACT

An overmodulation PWM control unit includes a voltage amplitude calculating unit for calculating a voltage command amplitude of an original voltage command based on current feedback control, a voltage amplitude correcting unit for performing linear compensation on the voltage command amplitude so that a fundamental amplitude of a pulse width modulation voltage provided from an inverter may match the original voltage command amplitude, and a harmonic determining unit for determining presence or absence of superimposition of a three-order harmonic component on a phase voltage command. The harmonic determining unit performs switching between presence and absence of the three-order harmonic component based on transition of the original voltage command amplitude to avoid passing through a change point where discontinuity occurs in the voltage amplitude characteristics representing a relationship between a fundamental amplitude obtained in advance for each of the cases of presence and absence of the superimposition of the three-order harmonic component and the voltage command amplitude required for achieving the fundamental amplitude.

6 Claims, 11 Drawing Sheets

FIG.2

| CONTROL METHOD | PWM CONTROL MODE | | RECTANGULAR WAVE VOLTAGE CONTROL MODE |
|---|---|---|---|
| | SINUSOIDAL PWM | OVERMODULATION PWM | RECTANGULAR WAVE (1 PULSE) |
| OUTPUT VOLTAGE WAVEFORM OF INVERTER | FUNDAMENTAL COMPONENT | FUNDAMENTAL COMPONENT | FUNDAMENTAL COMPONENT |
| MODULATION FACTOR | 0 – APPROX. 0.61 | MAX. IN SINUSOIDAL PWM – 0.78 | 0.78 |
| FEATURE | SMALL TORQUE VARIATION | INCREASED OUTPUT IN MIDDLE SPEED RANGE | INCREASED OUTPUT IN HIGH SPEED RANGE |

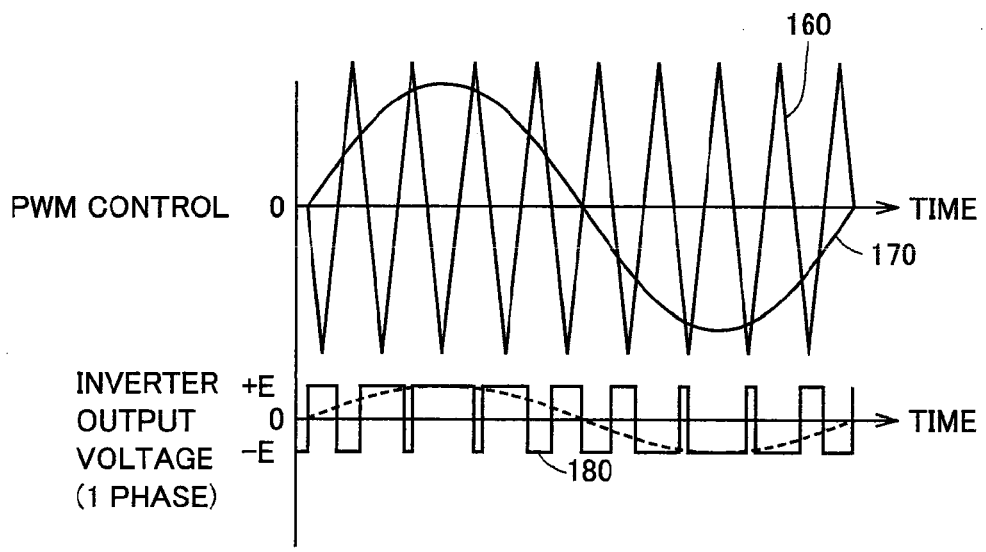

FIG.3

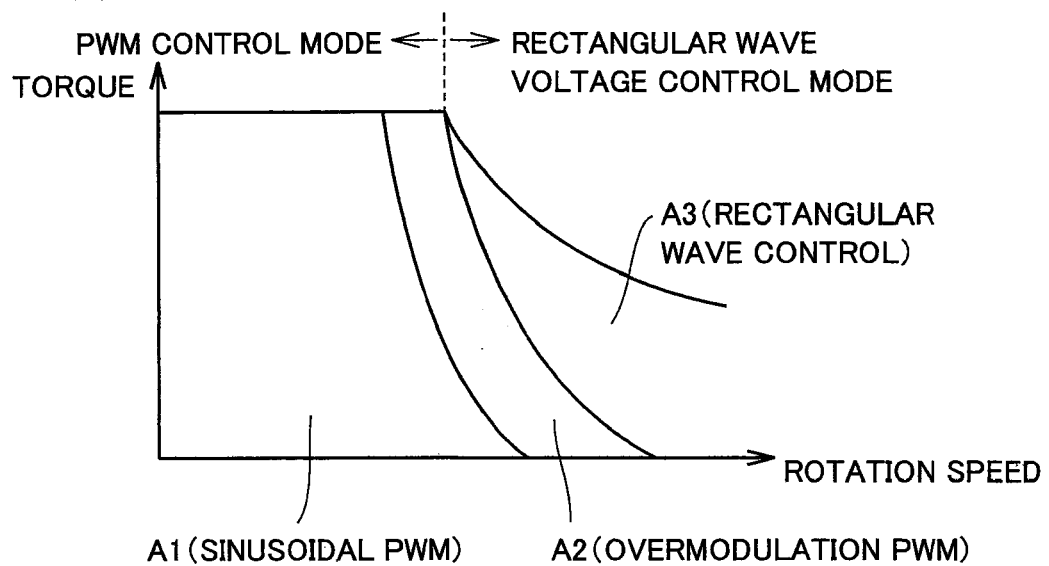

CONTROL DEVICE FOR AC MOTOR

This is a 371 national phase application of PCT/JP2009/051416 filed 29 Jan. 2009, the contents of which are incorporated herein by reference.

TECHNICAL FIELD

The present invention relates to a control device for an AC motor, and particularly to an overmodulation PWM (Pulse Width Modulation) control for an AC motor.

BACKGROUND ART

For performing drive control of an AC motor, using a DC power supply, a drive method using an inverter is employed. In the inverter, an inverter drive circuit performs switching control. For example, the AC motor receives a voltage of which switching is performed according to the Pulse Width Modulation (PWM) control based on a comparison in voltage between a voltage command and a carrier.

The PWM control is generally performed by a so-called sinusoidal PWM control in which an amplitude of a phase voltage command to the AC motor is kept within a range of a voltage amplitude of the carrier. However, the sinusoidal PWM control cannot sufficiently cope with a high power. Therefore, e.g., Japanese Patent Laying-Open No. 2008-11682 (Patent Document 1) has disclosed an overmodulation PWM control using a phase voltage command of an amplitude larger than a voltage amplitude of a carrier.

Drive control of an AC motor disclosed in the patent document 1 switches the control among the sinusoidal PWM control, overmodulation PWM control, and rectangular wave voltage phase control. In the overmodulation PWM control disclosed therein, linear compensation of a voltage amplitude is performed on d- and q-axis voltage commands based on results of feedback of d- and q-axis currents. Further, it has disclosed that, in the sinusoidal PWM control and overmodulation PWM control, modulation can be selected from between the modulation in which a three-order harmonic is superimposed on a sinusoidal phase voltage command and the modulation in which the three-order harmonic is not superimposed. Particularly, it has been proposed to change switching conditions of the control mode according to presence/absence of the three-order harmonic.

Patent Document 1: Japanese Patent Laying-Open No. 2008-11682

DISCLOSURE OF THE INVENTION

Problems to be Solved by the Invention

According to the voltage amplitude compensation in the overmodulation PWM control described in the patent document 1, the amplitude of the phase voltage command exceeds the amplitude of the carrier (typically, a triangular wave carrier) so that this compensation copes with a problem that an amplitude of a fundamental component of the pulse width modulation voltage provided from an inverter does not increase linearly with respect to linear increase of the amplitude of the phase voltage command.

Thus, the voltage amplitude compensation can be implemented by obtaining in advance characteristics (voltage amplitude characteristics) relating to a ratio between the voltage command amplitude required for obtaining the fundamental voltage amplitude corresponding to the original voltage command amplitude and the above fundamental voltage amplitude. More specifically, the control can be configured as follows. According to mapped voltage amplitude characteristics, the control obtains a magnification rate (correction rate) of the required voltage amplitude with respect to the original voltage command amplitude in original d- and q-axis voltage commands based on current feedback control. Further, the control calculates the d- and q-axis voltage commands that are corrected based on the voltage amplitude corrected according to the above correction rate.

However, the above voltage amplitude characteristics indicating the correction rate in the voltage amplitude compensation does not necessarily change uniformly when the original voltage command amplitude increases or decreases, and the correction rate on one side of a certain voltage command amplitude is significantly different from that on the other side. The number of times of switching per electric period of the inverter output voltage waveform changes at a point (change point) where the correction rate changes significantly. As is well known, a dead time is set in the inverter control. Therefore, the output voltage becomes discontinuous due to an influence of the dead time when the number of times of the switching changes. This may make the control unstable at the above change point.

When the overmodulation PWM control that allows selection of use/nonuse of the three-order harmonic is employed, a behavior near a peak value of the phase voltage command changes according to the presence/absence of the three-order harmonic. Therefore, a configuration for stabilizing the overmodulation PWM control must be employed in view of the above.

The invention has been made for overcoming the above problem, and an object of the invention is to stabilize electric motor control performed by overmodulation PWM control provided with an amplitude compensation function for a voltage command as well as a function of selecting presence and absence of three-order harmonic superimposition.

Means for Solving the Problems

A control device for an AC motor according to the invention is configured to receive a voltage controlled by an inverter, and includes a current sensing unit for sensing a current flowing between the inverter and the AC motor; and an overmodulation PWM control unit for controlling a pulse width modulation voltage provided from the inverter to the AC motor based on a voltage comparison between a phase voltage command of an amplitude exceeding a voltage amplitude of a carrier and the carrier.

The overmodulation PWM control unit includes a voltage command producing unit, a voltage amplitude calculating unit, a voltage amplitude correcting unit, a voltage command converting unit and a harmonic determining unit. The voltage command producing unit produces d- and q-axis voltage commands according to a deviation between a current command of the AC motor and an actual current based on a sensed value of the current sensing unit to eliminate the deviation. The voltage amplitude calculating unit calculates an original voltage command amplitude based on original d- and q-axis voltage commands produced by the voltage command producing unit. The voltage amplitude correcting unit corrects the d- and q-axis voltage commands such that a fundamental amplitude of the pulse width modulation voltage matches the original voltage command amplitude. The voltage command converting unit converts the d- and q-axis voltage commands corrected by the voltage amplitude correcting unit to the phase voltage command. The voltage amplitude correcting unit calculates a required correction rate with respect to the original voltage command amplitude according to preset voltage amplitude characteristics representing a relationship between the fundamental amplitude and a voltage command amplitude required for achieving the fundamental amplitude, and calculates the corrected d- and q-axis voltage commands based on the corrected voltage command amplitude produced by correcting the original voltage command amplitude according to the required correction rate. The voltage amplitude characteristics include first and second amplitude characteristics being set independently of each other according to presence and absence of superimposition of a three-order harmonic component on the phase voltage command converted by the voltage command converting unit. The harmonic determining unit determines the presence and absence of the superimposition of the three-order harmonic component on the phase voltage command converted by the voltage command converting unit, based on the first and second amplitude characteristics and the original voltage command amplitude calculated by the voltage amplitude calculating unit.

Preferably, the harmonic determining unit switches the control to the control without the superimposition of the three-order harmonic component when the original voltage command amplitude approaches, to a predetermined degree or more, a change point where linear characteristics of the required voltage command amplitude with respect to the fundamental amplitude becomes discontinuous on the first amplitude characteristics while the control with the superimposition of the three-order harmonic component is being performed, and switches the control to the control with the superimposition of the three-order harmonic component when the original voltage command amplitude approaches, to a predetermined degree or more, the change point on the second amplitude characteristics while the control without the superimposition of the three-order harmonic component is being performed.

Further preferably, the harmonic determining unit includes a change point storage unit, a transition degree calculating unit and an approach determining unit. The change point storage unit stores in advance the change point on the first and second amplitude characteristics. The transition degree calculating unit calculates a transition degree representing a present value of the voltage command amplitude and a changing direction. The approach determining unit is configured to change a present state about the presence and absence of the superimposition of the three-order harmonic component, based on the transition degree calculated by the transition degree calculating unit and the change point stored in the change point storage unit, when a difference between the original voltage command amplitude at the present time and the voltage amplitude corresponding to the change point is smaller than a first predetermined value.

Further preferably, the first predetermined value is variably set depending on the change speed of the original voltage command amplitude.

Preferably, while the control with the superimposition of the three-order harmonic component is being maintained, the harmonic determining unit gradually increases the amplitude of the three-order harmonic component to a predetermined upper limit when a difference between the original voltage command amplitude and a voltage amplitude corresponding to the change point on the first amplitude characters is larger than a second predetermined value, and gradually decreases the amplitude of the three-order harmonic component when the difference is equal to or smaller than the second predetermined value.

Preferably, the overmodulation PWM control unit further includes a synchronous PWM control unit for synchronizing the phase of the phase voltage command provided from the voltage command converting unit with the phase of the carrier. The synchronous PWM control unit synchronizes the phase of the phase voltage command with the phase of the carrier to determine variably a synchronization number that is a frequency of the carrier per period of the phase voltage command, according to a rotation speed of the AC motor. The first and second amplitude characteristics are set in advance corresponding to the synchronization number.

Effects of the Invention

The invention can stabilize the electric motor control performed by the overmodulation PWM control provided with the amplitude compensation function for the voltage command as well as the function of selecting the presence and absence of the three-order harmonic superimposition.

BRIEF DESCRIPTION OF THE DRAWINGS

FIG. 2 schematically illustrates a control mode of an AC motor M1 in the motor drive control system shown in FIG. 1.

FIG. 3 is a waveform diagram illustrating a basic principle of PWM control.

FIG. 4 is a conceptual diagram showing a correlation between an operation state of the AC motor and the above control mode.

DESCRIPTION OF THE REFERENCE SIGNS

5 ground line, 6 and 7 power line, 10 and 13 voltage sensor, 10# DC voltage generating unit, 11 and 24 current sensor, 12 converter, 14 inverter, 15-17 phase arm, 25 rotation angle sensor, 30 control device (ECU), 100 motor drive control system, 160 carrier, 170 phase voltage command, 172 three-order harmonic component, 174 phase voltage command (three-order harmonic superimposition), 180 pulse width modulation voltage, 200 overmodulation PWM control unit, 210 current command producing unit, 220 and 250 coordinate transforming unit, 230 current filter, 240 voltage command producing unit, 245 voltage amplitude calculating unit, 260 PWM modulation unit, 270 voltage amplitude correcting unit, 271 and 272 map (voltage amplitude characteristics), 280 synchronous PWM control unit, 290 rotation frequency calculating unit, 300 harmonic determining unit, 300a voltage amplitude characteristics (without harmonic), 300b voltage amplitude characteristics (with harmonic), 302 change point map, 304 parameter calculating unit, 306 change point approach determining unit, 500 approach region, 510 preliminary approach region, A1 low rotation speed range, A2 middle rotation speed range, A3 high rotation speed range, B DC power supply, C0 and C1 smoothing capacitor, D1-D8 diode, Ib DC current, Id d-axis current, Idcom d-axis current command value, Iq q-axis current, Iqcom q-axis current command value, iu, iv and iw three-phase current, K synchronization number, L1 reactor, M1 AC motor, Pa(i) change point (without harmonic), Pb(i) change point (with harmonic), Q1-Q8 power semiconductor switching element, S1-S8 switching control signal, Shr determination flag (with/without harmonic), SR1 and SR2 system relay, Trqcom torque command value, VA voltage command amplitude (before compensation), VA# voltage command amplitude (after linear compensation), VL DC voltage (battery), Vd d-axis voltage command (before correction), Vd# d-axis voltage command value (after correction), VH system voltage, Vp transition parameter, Vq q-axis voltage command (before correction), Vq# q-axis voltage command value (after correction), Vu, Vv and Vw phase voltage command, ΔId d-axis current deviation, ΔIq q-axis current deviation, θ rotor rotation angle, ωe rotation angle speed.

BEST MODES FOR CARRYING OUT THE INVENTION

Embodiments of the invention will now be described with reference to the drawings. In the following description, the same or corresponding portions bear the same reference numbers, and description thereof is not repeated in principle.

(Whole Structure of Motor Control)

Figure 1:
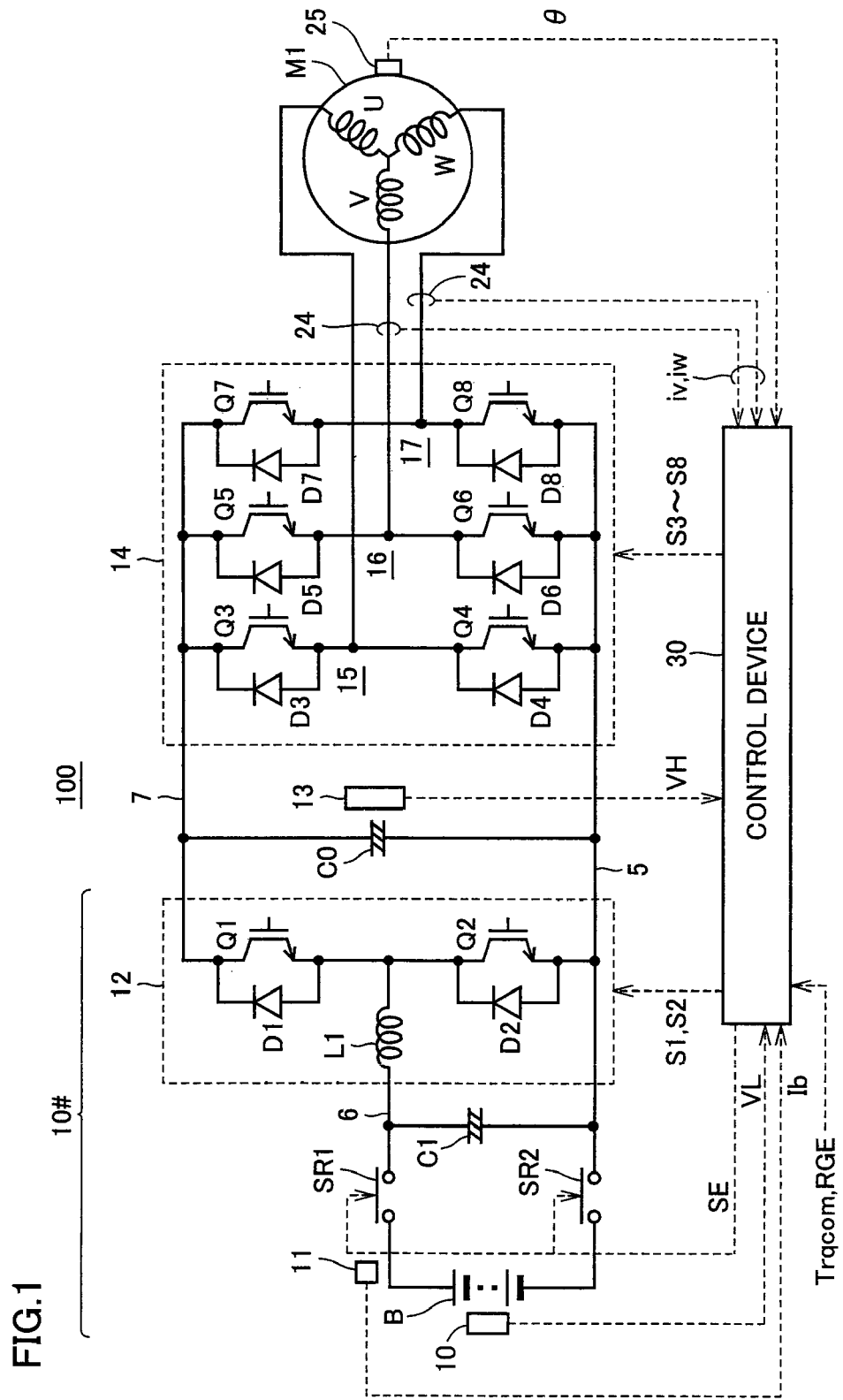
FIG. 1 shows a whole structure of a motor drive control system for employing a control device for an AC motor according to an embodiment of the invention.

FIG. 1 shows a whole structure of a motor drive control system employing a control device for an AC motor according to an embodiment of the invention.

Referring to FIG. 1, a motor drive control system 100 includes a DC voltage generating unit 10#, a smoothing capacitor C0, an inverter 14, an AC motor M1 and a control device 30.

An AC motor M1 is, e.g., a drive motor for generating a torque that drives drive wheels of an electric powered vehicle (i.e., a vehicle such as a hybrid vehicle, an electric vehicle, a fuel-cell electric vehicle or the like generating a vehicle drive power from an electric energy). AC motor M1 may be configured to have a function of an electric generator driven by an engine, or may be configured to have both the functions of the electric motor and the electric generator. Further, AC motor M1 may be configured to operate as an electric motor with respect to the engine and, for example, may be incorporated into a hybrid vehicle for starting the engine. Thus, in the embodiment, the "AC motor" includes an electric motor, an electric generator and a motor generator of an AC-drive type.

DC voltage generating unit 10# includes a DC power supply B, system relays SR1 and SR2, a smoothing capacitor C1 and a converter 12.

DC power supply B is typically formed of a secondary battery such as a nickel hydrogen battery or a lithium-ion battery, or a power storage device such as an electrical double layer capacitor. A voltage sensor 10 and a current sensor 11 sense a DC voltage VL provided from DC power supply B and a DC current Ib provided to/from DC power supply B, respectively.

A system relay SR1 is connected between a positive terminal of DC power supply B and a power line 6, and a system relay SR1 is connected between a negative terminal of DC power supply B and a ground line 5. Control device 30 provides a signal SE turning on/off system relays SR1 and SR2.

Converter 12 includes a reactor L1, power semiconductor switching elements Q1 and Q2, and diodes D1 and D2. Power semiconductor switching elements Q1 and Q2 are connected in series between a power line 7 and ground line 5. Control device 30 provides switching control signals S1 and S2 turning on/off power semiconductor switching elements Q1 and Q2, respectively.

In this embodiment of the invention, the power semiconductor switching element (which will be simply referred to as the "switching element" hereinafter) may be an IGBT (Insulated Gate Bipolar Transistor), a power MOS (Metal Oxide Semiconductor) transistor, a power bipolar transistor or the like. Anti-parallel diodes D1 and D2 are arranged with respect to switching elements Q1 and Q2, respectively. Reactor L1 is connected between a connection node between switching elements Q1 and Q2 and power line 6. Smoothing capacitor C0 is connected between power line 7 and ground line 5.

Inverter 14 is arranged in parallel between power line 7 and ground line 5, and is formed of upper and lower U-phase arms 15, upper and lower V-phase arms 16 and upper and lower W-phase arms 17. The upper and lower arms of each phase are formed of switching elements that are connected in series between power line 7 and ground line 5. For example, upper and lower U-phase arms 15 are formed of switching elements Q3 and Q4, respectively, upper and lower V-phase arms 16 are formed of switching elements Q5 and Q6, respectively, and upper and lower W-phase arms 17 are formed of switching elements Q7 and Q8, respectively. Anti-parallel diodes D1-D8 are connected to switching elements Q3-Q8, respectively. Control device 30 provides switching control signals S3-S8 turning on/off switching elements Q3-Q8, respectively.

Typically, AC motor M1 is a three-phase synchronous motor of a permanent magnet type, and is formed of three, i.e., U-, V- and W-phase coils each having ends, one of which is connected to a common neutral point. The other ends thereof are connected to intermediate points of the switching elements of the upper and lower arms 15-17 of the respective phases.

Converter 12 is basically controlled such that switching elements Q1 and Q2 are turned on and off alternately and complementarily to each other in each switching period. In the boost operation, converter 12 boosts DC voltage VL supplied from DC power supply B to a DC voltage VH (which corresponds to an input voltage of inverter 14 and may be referred to as a "system voltage" hereinafter). This boost operation is performed by supplying an electromagnetic energy that is accumulated in reactor L1 during the on period of switching element Q2 to power line 7 through switching element Q1 and anti-parallel diode D1.

In a step-down operation, converter 12 steps down DC voltage VH to DC voltage VL. This step-down operation is performed by supplying an electromagnetic energy accumulated in reactor L1 during the on period of switching element Q1 to power line 6 through switching element Q2 and anti-parallel diode D2. In these boost and step-down operations, a voltage conversion ratio (a ratio between VH and VL) is controlled by an on-period ratio (duty ratio) of switching elements Q1 and Q2 with respect to the above switching period. When switching elements Q1 and Q2 are fixed to the on and off states, respectively, VH becomes equal to VL (VH=VL, i.e., voltage conversion ration is equal to 1.0).

Smoothing capacitor C0 smoothes the DC voltage provided from converter 12, and supplies the smoothed DC voltage to inverter 14. A voltage sensor 13 senses the voltage between the opposite ends of smoothing capacitor C0, i.e., system voltage VH, and provides a sensed value thereof to control device 30.

When a torque command value of AC motor M1 is positive (Trqcom>0) and smoothing capacitor C0 supplies the DC voltage, inverter 14 converts the supplied DC voltage to the AC voltage by the switching operations of switching elements Q3-Q8 responding to switching control signals S3-S8, respectively, and thereby drives AC motor M1 to output a positive torque. When the torque command value of AC motor M1 is zero (Trqcom=0), inverter 14 converts the DC voltage to the AC voltage by the switching operations performed in response to switching control signals S3-S8, respectively, and drives AC motor M1 to set the torque equal to 0. Thereby, AC motor M1 is driven to generate a torque of zero or a positive value indicated by torque command value Trqcom.

Further, in a regenerative braking operation of the electric powered vehicle equipped with motor drive control system 100, torque command value Trqcom of AC motor M1 is set negative (Trqcom<0). In this case, inverter 14 converts the AC voltage generated by AC motor M1 to the DC voltage by the switching operations performed in response to switching control signals S3-S8, and provides the converted DC voltage (system voltage) to converter 12 through smoothing capacitor C0. The regenerative operation in this description includes braking that is accompanied by regenerative power generation and is performed when a driver of the electric powered vehicle operates a foot brake, and also includes deceleration (or stop of acceleration) that is accompanied by the regenerative power generation and is performed by releasing an accelerator pedal during running without operating the foot brake.

A current sensor 24 senses the current flowing through AC motor M1, and provides the sensed motor current to control device 30. Since a sum of instantaneous values of three-phase currents iu, iv and iw is zero, current sensor 24 can be arranged to sense merely the motor currents of two phases (e.g., V- and W-phase currents iv and iw) as shown in FIG. 1.

A rotation angle sensor (resolver) 25 senses a rotor rotation angle θ of AC motor M1, and sends sensed rotation angle θ to control device 30. Control device 30 can calculate the number of rotations, i.e., rotation speed and the angular speed ωe (rad/s) of AC motor M1 based on rotation angle θ. Rotation angle sensor 25 can be eliminated when control device 30 is configured to calculate directly rotation angle θ from the motor voltage and current.

Control device 30 is formed of an Electronic Control Unit (ECU), and controls the operation of motor drive control system 100 by software processing performed by the CPU (not shown) executing prestored programs and/or by hardware processing performed by a dedicated electronic circuit.

By a typical function, control device 30 controls the operations of converter 12 and inverter 14 so that AC motor M1 outputs the torque according to torque command value Trqcom by a control scheme to be described later based on torque command value Trqcom provided thereto, DC voltage VL sensed by voltage sensor 10, DC current Ib sensed by current sensor 11, system voltage VII sensed by voltage sensor 13, motor currents iv and iw provided from current sensor 24, rotation angle θ provided from rotation angle sensor 25 and others. Thus, control device 30 produces switching control signals S1-S8 for controlling converter 12 and inverter 14 as described above, and provides them to converter 12 and inverter 14.

In the boosting operation of converter 12, control device 30 performs feedback control of system voltage VII to produce switching control signals S1 and S2 so that system voltage VH may match the voltage command value.

When control device 30 receives from an external ECU a signal RGE indicating that electric powered vehicle has entered the regenerative braking mode, it produces switching control signals S3-S8 for converting the AC voltage generated by AC motor M1 to the DC voltage, and provides them to inverter 14. Thereby, inverter 14 converts the AC voltage generated by AC motor M1 to the DC voltage, and supplies it to converter 12.

Further, when control device 30 receives, from external ECU, signal RGE indicating that the electric powered vehicle has entered the regenerative braking mode, it generates switching control signals S1 and S2 to step down the DC voltage supplied from inverter 14, and provides it to converter 12. Thereby, the AC voltage generated by AC motor M1 is converted to the DC voltage, is stepped down and is supplied to DC power supply B.

(Description of Control Mode)

The control of AC motor M1 by control device 30 will be described further in detail.

FIG. 2 schematically shows a control mode of AC motor M1 in the motor drive control system according to the embodiment of the invention.

As shown in FIG. 2, motor drive control system 100 according to the embodiment of the invention selectively uses three control modes for the control of AC motor M1, i.e., for the electric power conversion in inverter 14.

The control mode can be broadly divided into a PWM control mode and a rectangular wave voltage control mode. In the PWM control mode, sinusoidal wave PWM control and overmodulation PWM control are selectively employed.

Referring to FIG. 3, the PWM control performs the on/off control of the switching elements of each phase in inverter 14 based on a comparison between a carrier 160 and a phase voltage command 170, and thereby applies a pulse width modulation voltage 180 as a pseudo sinusoidal voltage to each phase of AC motor M1. Carrier 160 is formed of a triangular wave or a saw-tooth-wave.

In the PWM modulation for the inverter control, the amplitude of carrier 160 originally corresponds to an input DC voltage (system voltage VH) of inverter 14. However, when the amplitude of phase voltage command 170 is converted according to system voltage VH, the amplitude of carrier 160 can be fixed.

In the sinusoidal PWM control that restricts the amplitude of the sinusoidal voltage command to fall within a range not exceeding the amplitude of the carrier as is well known, a fundamental component of a voltage applied to AC motor M1 can be raised only to a value about 0.61 times as large as a DC link voltage of the inverter. In the specification, a ratio of the fundamental component (effective value) of the motor-applied voltage (line voltage) with respect to the DC link voltage (i.e., system voltage VH) of inverter 14 will be referred to as a "modulation factor" hereinafter.

Conversely, the rectangular wave voltage control applies one pulse of the rectangular wave of which ratio between high- and low-level periods is 1:1 to the AC motor during the above certain period. This increases the modulation factor to 0.78.

The overmodulation PWM control performs the PWM control similar to the sinusoidal PWM control described above within a range where the amplitude of the voltage command (sinusoidal component) is larger than the carrier amplitude. In particular, the fundamental component can be increased by correcting the voltage amplitude for the voltage amplitude compensation already described, and the modulation factor can be increased from the maximum modulation factor in the sinusoidal PWM control mode to a range of 0.78. In the overmodulation PWM control, the amplitude of the voltage command (sinusoidal component) is larger than the carrier amplitude so that the line voltage applied to AC motor M1 is not sinusoidal but has a distorted form.

In AC motor M1, when the rotation speed and output torque increases, an induced voltage rises so that the required drive voltage (motor-required voltage) rises. The voltage boosted by converter 12, i.e., system voltage VH must be set higher than this motor-required voltage. However, a limit value (VH-maximum voltage) is present in system voltage VH, i.e., the voltage boosted by converter 12.

Accordingly, according to the operation state of AC motor M1, the control is performed by selectively employing the modes that control the amplitude and phase of the motor-applied voltage (AC voltage) by the feedback of the motor current, and thus is performed by selectively employing the PWM control mode implemented by the sinusoidal PWM control or the overmodulation PWM control and the rectangular wave voltage control mode. In the rectangular wave voltage control, the amplitude of the motor-applied voltage is fixed so that the torque control is executed by the phase control of the rectangular wave voltage pulse based on a deviation between the practical torque value and the torque command value.

FIG. 4 shows a correlation between the operation state of AC motor M1 and the above control mode.

Referring to FIG. 4, the system generally employs the sinusoidal PWM control for reducing the torque variations in a low rotation speed range A1, uses the overmodulation PWM control in a middle rotation speed range A2 and uses the rectangular wave voltage control in a high rotation speed range A3. In particular, the employment of the overmodulation PWM control and rectangular wave voltage control enables to scale up the output of AC motor M1. As described above, the selection of the control modes shown in FIG. 2 is basically performed within a range of an achievable modulation factor.

As will be described below, the control device for the AC motor of the embodiment has a distinctive feature in the overmodulation PWM control. Therefore, the control structure of the overmodulation PWM control will be described below in detail.

(Overmodulation PWM Control)

Figure 5:
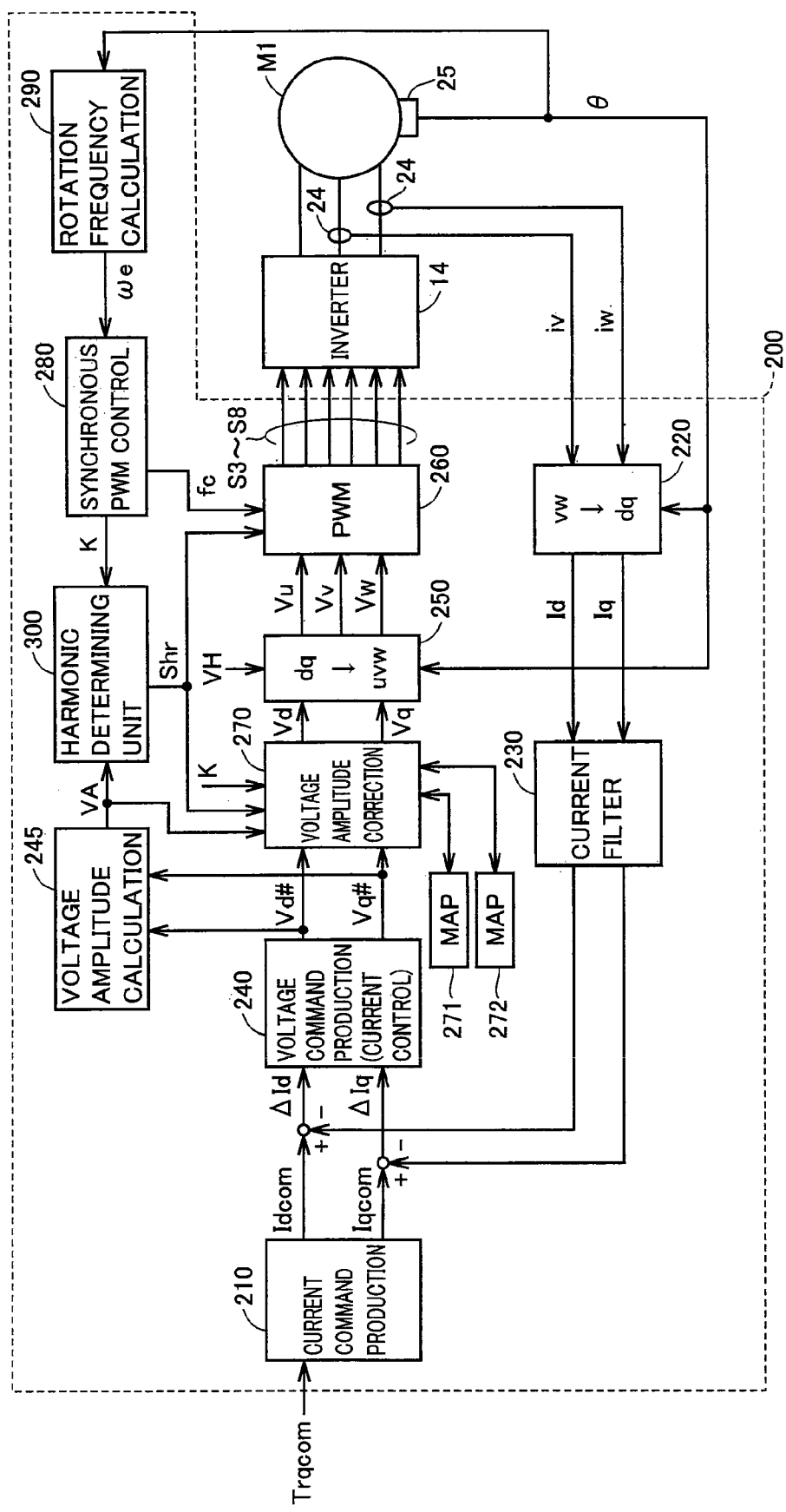
FIG. 5 is a functional block diagram showing a block diagram illustrating the overmodulation PWM control by a control device for the AC motor according to the embodiment of the invention.

FIG. 5 is a functional block diagram illustrating the overmodulation PWM control by the control device for the AC motor according to the embodiment of the invention.

Referring to FIG. 5, an overmodulation PWM control unit 200 has a current command producing unit 210, a coordinate transforming unit 220, a current filter 230, a voltage command producing unit 240, a voltage amplitude calculating unit 245, a coordinate transforming unit 250, a PWM modulation unit 260, a voltage amplitude correcting unit 270, a synchronous PWM control unit 280 and a rotation frequency calculating unit 290. Various function blocks for the motor control that are illustrated in the following block diagrams including FIG. 5 are implemented by hardware processing or software processing executed by control device 30.

According to a map or the like that is prepared in advance, current command producing unit 210 produces d- and q-axis current command values Idcom and Iqcom corresponding to torque command value Trqcom of AC motor M1. For example, a set of d- and q-axis current command values Idcom and Iqcom corresponding to torque command value Trqcom are determined to achieve the current phase that maximizes the output torque when the current amplitude is constant.

Coordinate transforming unit 220 performs the coordinate conversion (from three phases to two phases) using rotation angle θ of AC motor M1 sensed by rotation angle sensor 25, and thereby converts the three phase current based on v- and w-phase currents iv and iw sensed by current sensor 24 to calculate d- and q-axis currents Id and Iq.

Current filter 230 performs the processing of smoothing, in the time-axis direction, d- and q-axis currents Id and Iq calculated by coordinate transforming unit 220. Thereby, the filtering processing is effected on actual currents Id and Iq based on the sensed value of the sensor.

Voltage command producing unit 240 receives deviation ΔId (ΔId=Idcom−Id) and ΔIq (ΔIq=Iqcom−Iq) with respect to the command values of the d- and q-axis currents, respectively. Therefore, voltage command producing unit 240 produces d- and q-axis voltage command values Vd# and Vq# based on predetermined control calculation (typically, PI (Proportional Integration) calculation) performed for eliminating d- and q-axis current deviations ΔId and ΔIq.

Voltage amplitude calculating unit 245 calculates a voltage command amplitude VA according to the following equation (1) based on original d- and q-axis voltage commands Vd# and Vq# calculated by voltage command producing unit 240. Thus, voltage command amplitude VA calculated by voltage amplitude calculating unit 245 indicates the voltage command amplitude that is originally required for the current feedback control.

$$VA = (Vd^2 + Vq^2)^{0.5} \quad (1)$$

Voltage amplitude correcting unit 270 obtains an magnification rate (correction rate) of the voltage command amplitude that is required for original voltage command amplitude VA calculated by voltage amplitude calculating unit 245, and particularly is required for obtaining this voltage command amplitude VA as the fundamental amplitude of pulse width modulation voltage 180 (FIG. 3) of overmodulation PWM. Also, voltage amplitude correcting unit 270 corrects the d- and q-axis voltage commands to perform linear compensation of the voltage command amplitude according to the above correction rate, and outputs the d- and q-axis voltage commands Vd and Vq thus corrected. The linear compensation by voltage amplitude correcting unit 270 will be described later in detail.

Coordinate transforming unit 250 performs the coordinate transformation (from two phases to three phases) using rotation angle θ of AC motor M1, and thereby converts d- and q-axis voltage commands Vd and Vq corrected by voltage amplitude correcting unit 270 to U-, V- and W-phase voltage commands Vu, Vv and Vw. Phase voltage commands Vu, Vv and Vw are collectively represented as phase voltage command 170 in FIG. 3. As described above, the amplitude of phase voltage command 170 is converted according to system voltage VH.

Rotation frequency calculating unit 290 calculates a rotation frequency (angular speed) ωe based on the output of rotation angle sensor 25. Synchronous PWM control unit 280 controls PWM modulation unit 260 to execute the synchronous PWM for synchronizing the phases of carrier 160 and phase voltage command 170 (FIG. 3) according to rotation angle speed ωe obtained by rotation frequency calculating unit 290.

More specifically, synchronous PWM control unit 280 determines a synchronization number K, which corresponds to the frequency of carrier 160 contained within one period of the phase voltage command (i.e., one electrical angle period of AC motor M1), according to rotation angle speed δe, and sets a frequency fc of the carrier for transmitting them to PWM modulation unit 260.

PWM modulation unit 260 produces carrier 160 that follows frequency fc set by synchronous PWM control unit 280 so that carrier 160 may be synchronized with phase voltage command 170. Based on the voltage comparison between carrier 160 and phase voltage command 170 shown in FIG. 3, PWM modulation unit 260 produces switching control signals S3-S8 of inverter 14 according to respective phase voltage commands Vu, Vv and Vw.

Overmodulation PWM control unit 200 further includes a harmonic determining unit 300 for determining whether superimposition of a three-order harmonic on each of phase voltage commands Vu, Vv and Vw is required or not.

Harmonic determining unit 300 produces a determination flag Shr indicating that the superimposition of the three-order harmonic on each phase voltage command is required, or is not required (which may be represented as "with/without the harmonic" hereinafter) based on original voltage command amplitude VA obtained by voltage amplitude calculating unit 245.

Figure 6:
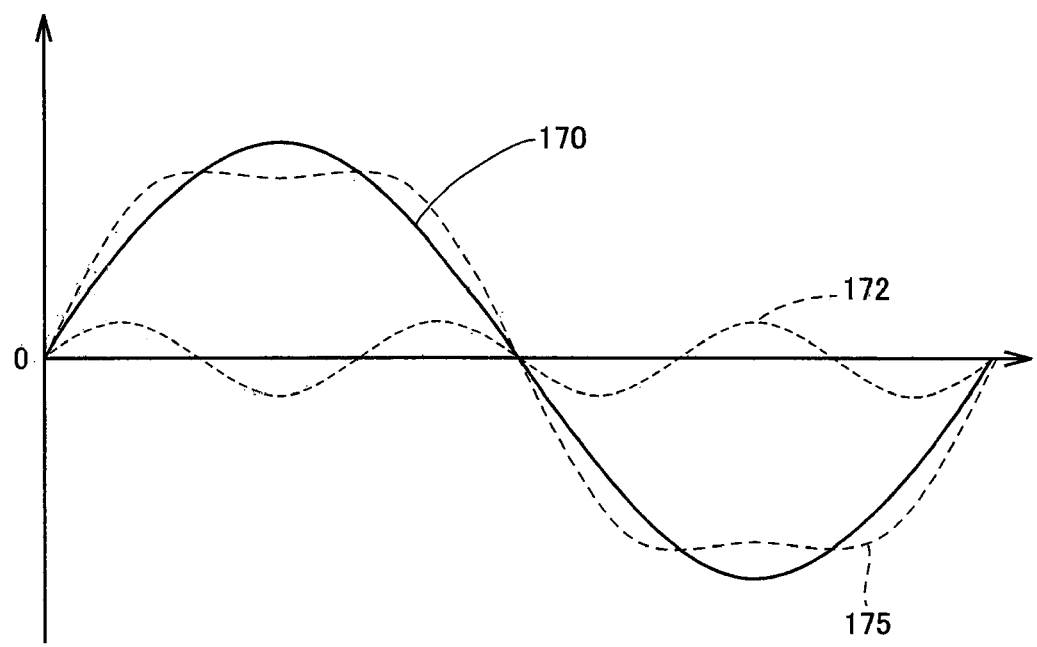
FIG. 6 is a waveform diagram illustrating changes in phase voltage command according to a result of the determination by a harmonic determining unit shown in FIG. 5.

FIG. 6 is a waveform diagram illustrating changes in phase voltage command according to a result of the determination by the harmonic determining unit.

Referring to FIG. 6, when determination flag Shr is turned on, PWM modulation unit 260 makes a comparison between carrier 160 (FIG. 3) and a phase voltage command 175 produced by superimposing three-order harmonic component 172 on phase voltage command 170 generated by coordinate transforming unit 250. Since three-order harmonic component 172 has a frequency three times as large as phase voltage command 170 so that three-order harmonic component 172 superimposed on phase voltage command 170 is cancelled between lines of AC motor M1. Therefore, the line voltage of AC motor M1 can follow sinusoidal phase voltage command 170. Also, by distorting a peak portion caused by the three-order harmonic component, the fundamental component of pulse width modulation voltage 180 (FIG. 3) can be relatively increased. It is well known that the frequency equal to 3n (n: natural number larger than 2) times as large as the rotation frequency (electrical angle) of AC motor M1 can achieve substantially the same effect as the three-order harmonic. According to the embodiment, the above 3n-order (n: natural number) harmonic will be generally represented as the "three-order harmonic" hereinafter.

Conversely, when determination flag Shr is turned off, PWM modulation unit 260 directly compares phase voltage command 170 produced by coordinate transforming unit 250 with carrier 160 (FIG. 3).

Then, the linear compensation of the voltage command amplitude by voltage amplitude correcting unit 270 will be described below in detail.

As described above, in the overmodulation PWM control in which the amplitude of phase voltage command 170 (three-phase voltage commands Vu, Vv and Vw) exceeds the amplitude of carrier 160, when the amplitude of phase voltage command 170 increases linearly, the amplitude of the fundamental component of pulse width modulation voltage 180 provided from inverter 14 does not increase linearly, and is smaller than the amplitude of phase voltage command 170. Therefore, voltage amplitude correcting unit 270 corrects and changes d- and q-axis voltage commands Vd# and Vq# to d- and q-axis voltage commands Vd and Vq, respectively, so that the fundamental amplitude of the output voltage (pulse width modulation voltage 180) of inverter 14 may match original voltage command amplitude VA calculated by voltage amplitude calculating unit 245.

Voltage command amplitude VA# that is required for providing the fundamental amplitude of the pulse width modulation voltage of the overmodulation PWM that matches original voltage command amplitude VA can be obtained according to the voltage amplitude characteristics shown in FIG. 6.

Figure 7:
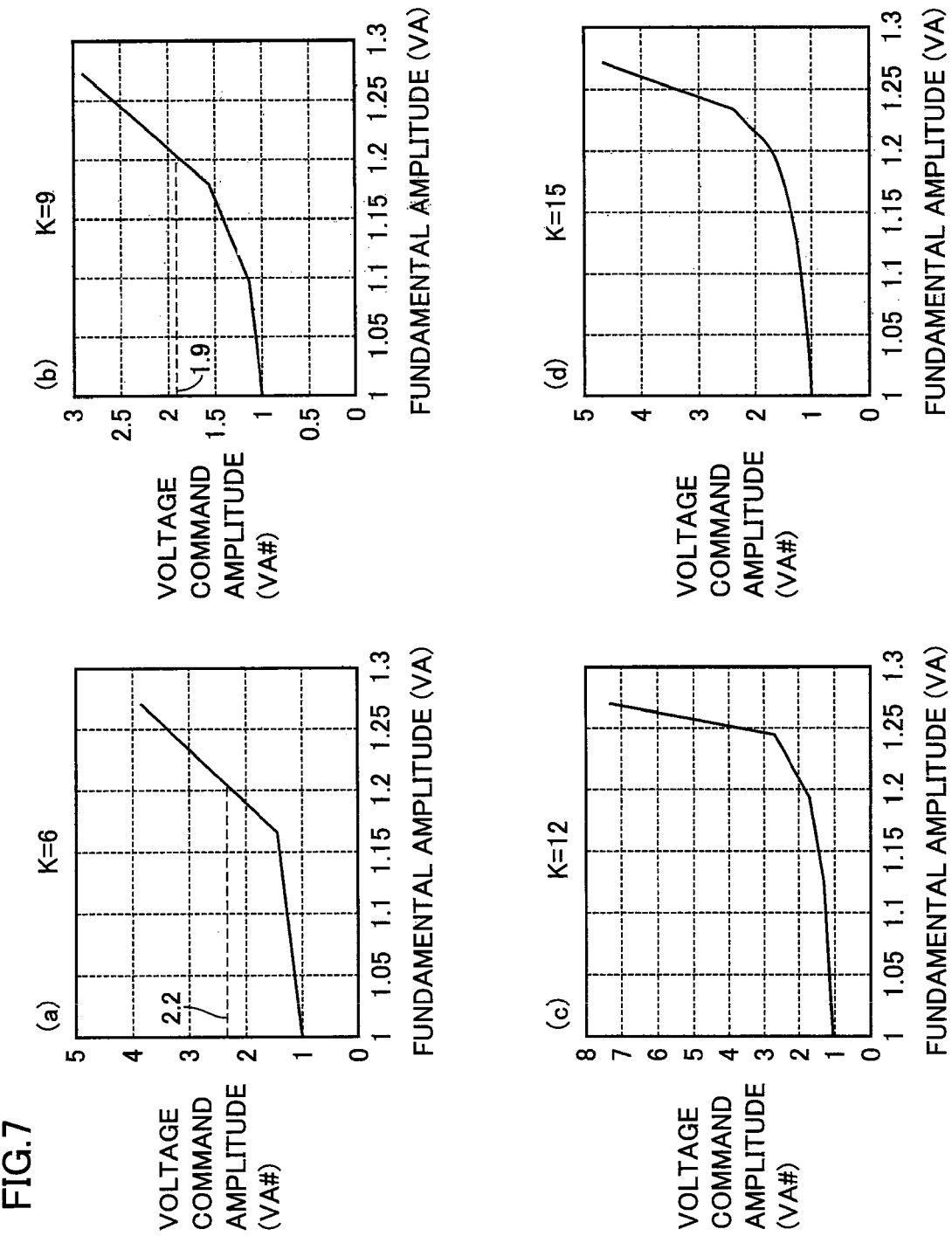
FIG. 7 is a diagram for showing an example of a voltage amplitude characteristic map.

FIG. 7 shows an example of the voltage amplitude characteristic map used for obtaining the correction rate of the voltage command amplitude according to the foregoing voltage amplitude characteristics. Even when the voltage command amplitude is constant, the amplitude of the fundamental component (which will be referred to as the "fundamental amplitude" hereinafter) of pulse width modulation voltage 180 changes depending on synchronization number K of carrier 160. Therefore, it is preferable to set the voltage amplitude characteristic map for each synchronization number K.

FIGS. 7(a), 7(b), 7(c) and 7(d) show the voltage amplitude characteristic maps corresponding to values of synchronization number K equal to 6, 9, 12 and 15, respectively. For confirmation, it is stated that synchronization number K may take any value (a multiple of 3) other than 6, 9, 12 and 15. In this embodiment, it is not essential that synchronization number K is variable. For confirmation, it is stated that the invention can be applied to the overmodulation PWM control employing the synchronous PWM of the fixed synchronization number.

In the voltage amplitude characteristic map of FIG. 7, each of the fundamental amplitude and the voltage command amplitude take a normalized value obtained by division by the carrier amplitude. For example, when synchronization number K is 6 and original voltage command amplitude VA is 1.2 (1.2 times as large as the carrier amplitude), the voltage amplitude correction map in FIG. 7(a) is used to change the value of the voltage command amplitude to 2.2 (2.2 times as large as the carrier amplitude), so that the fundamental amplitude of pulse width modulation voltage 180 may become equal to 1.2 (1.2 times as large as the carrier amplitude). When synchronization number K is 9 and voltage command amplitude VA is 1.2 (1.2 times as large as the carrier amplitude), the voltage amplitude characteristic map in FIG. 7(b) is used to change the value of the voltage command amplitude to 1.9 (1.9 times as large as the carrier amplitude), so that the fundamental amplitude of the pulse width modulation voltage may become equal to 1.2 times (1.2 times as large as the carrier amplitude). Thus, the abscissa in FIGS. 7(a)-7(d) gives the original voltage command amplitude VA, and the ordinate gives voltage command amplitude VA# corrected by voltage amplitude correcting unit 270.

By compensating the voltage command amplitude, using the different voltage amplitude characteristics depending on synchronization number K, it is possible to avoid deterioration in control property that may be caused by the change in fundamental amplitude of the output voltage (pulse width modulation voltage 180) of inverter 14.

Figure 8:
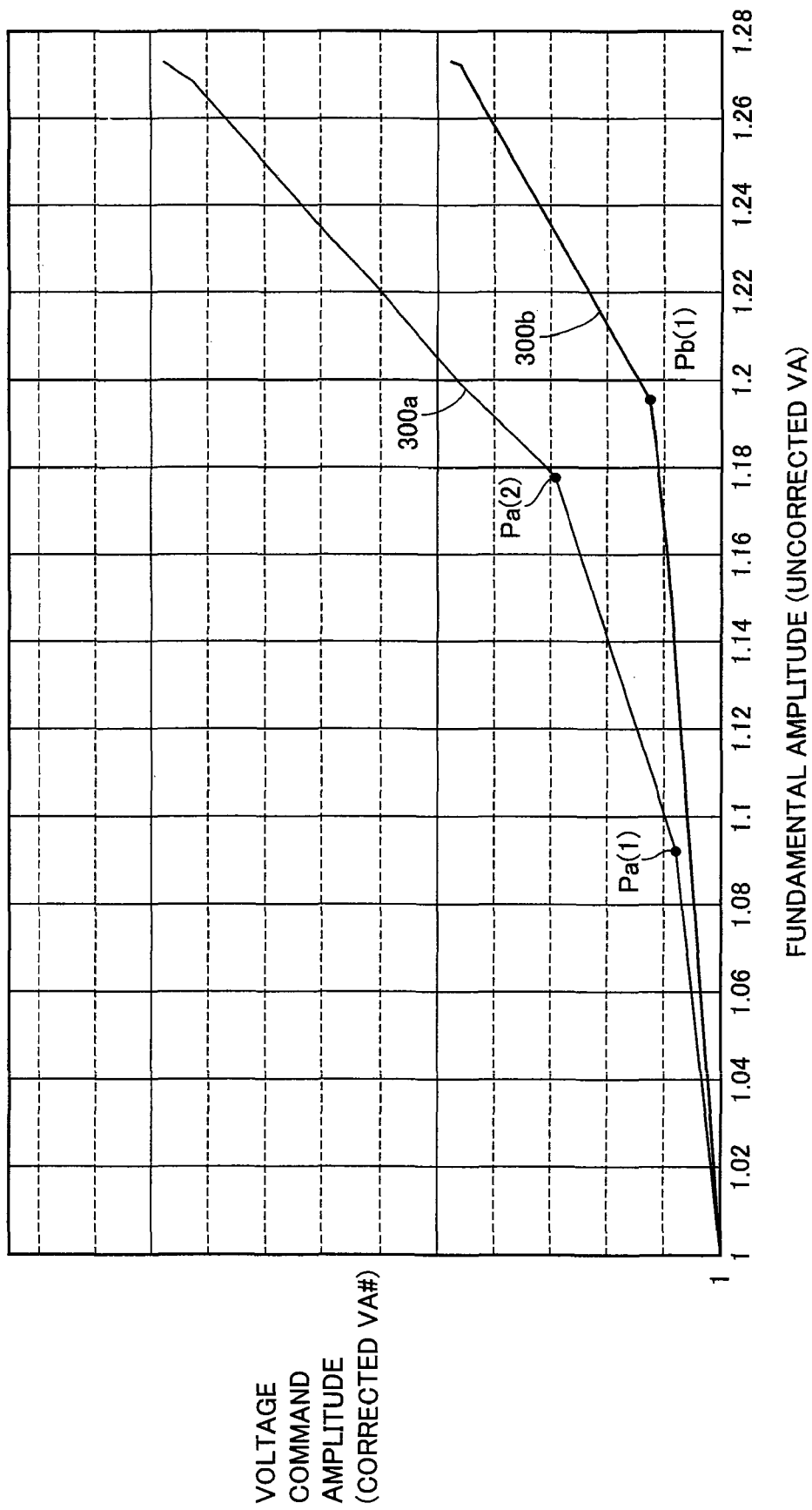
FIG. 8 is a first diagram illustrating a difference in voltage amplitude characteristics caused by presence and absence of superimposition of the three-order harmonic on a carrier.

Even when synchronization number K is constant, the voltage amplitude characteristics change depending on whether the harmonic is present or not. FIG. 8 shows the voltage amplitude characteristics appearing when synchronization number K is 9, and particularly when the harmonic is present, and when it is not present.

Referring to FIG. 8, voltage amplitude characteristics 300a exhibited when the harmonic is not present are the same as that in FIG. 7(b). Conversely, according to voltage amplitude characteristics 300b exhibited when the harmonic is present, the superimposition of the three-order harmonic ensures the on period of the switching element near the peak value of phase voltage command 170, and therefore the corrected voltage command amplitude for obtaining the same fundamental amplitude is smaller than that exhibited when the harmonic is not present.

In voltage amplitude characteristics 300a, it can be understood that there are change points Pa(1) and Pa(2) where a change occurs in ratio of the corrected voltage command amplitude with respect to the fundamental voltage amplitude, i.e., in gradient of the voltage amplitude characteristics in FIG. 8. Similar change points Pb(1) is present in voltage amplitude characteristics 300b. However, it can be understood that voltage amplitude characteristics 300a are different from voltage amplitude characteristics 300b in voltage command amplitude (VA) corresponding to the change point. Each of such change points Pa(i) and Pb(i) (i: natural number) provides a boundary where the ratio of the corrected voltage command amplitude with respect to the fundamental voltage amplitude becomes discontinuous.

Figure 9:
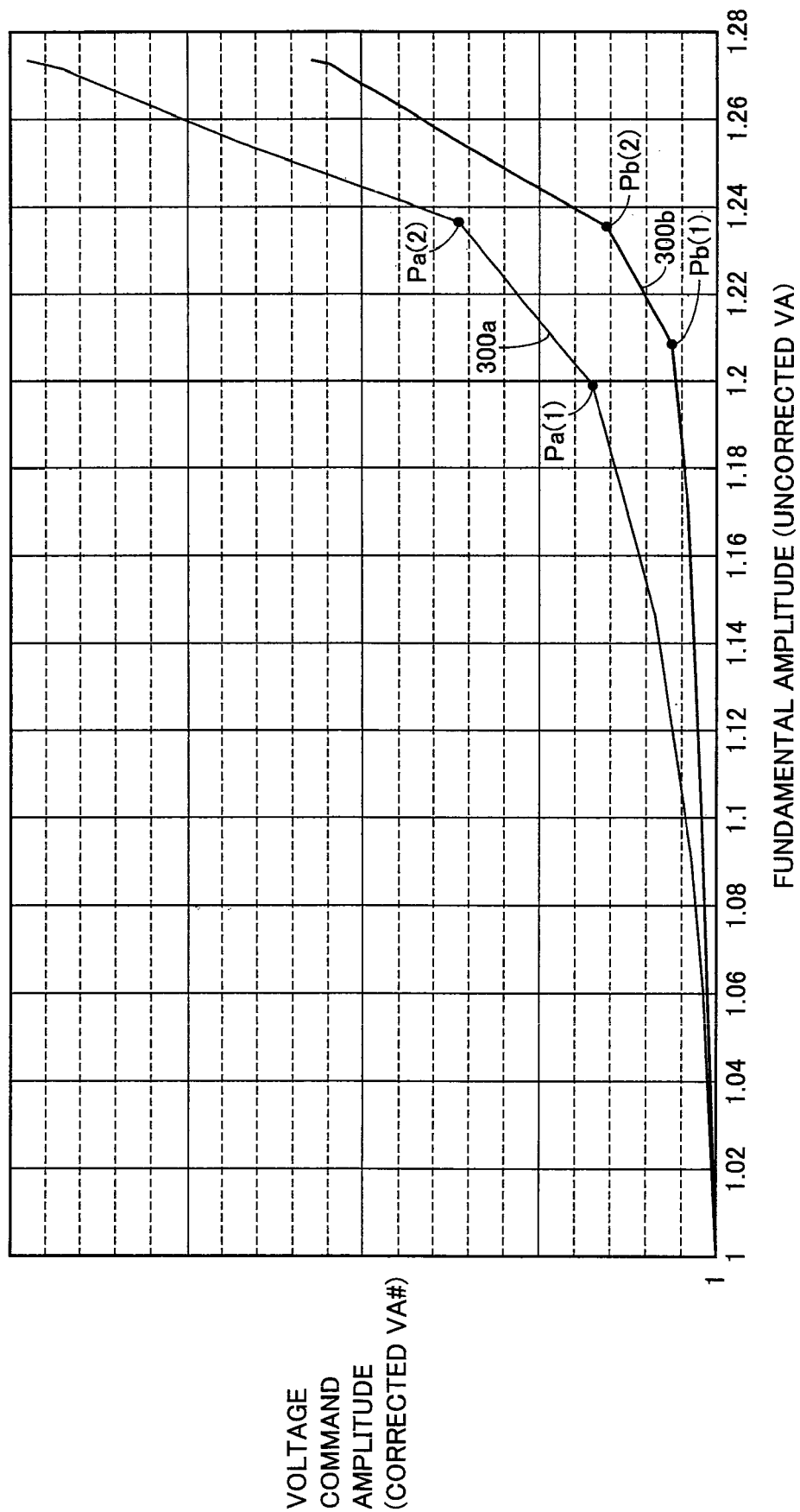
FIG. 9 is a second diagram illustrating the difference in voltage amplitude characteristics caused by the presence and absence of the superimposition of the three-order harmonic on the carrier.

FIG. 9 shows voltage amplitude characteristics 300a and 300b that are exhibited with synchronization number K equal to 15 when the harmonic is present and when it is absent, respectively. Change points Pa(1) and Pa(2) are present on voltage amplitude characteristics 300a, and change points Pb(1) and Pb(2) are present on voltage amplitude characteristics 300b.

When synchronization number K is equal to 15, voltage amplitude characteristics 300a differ from voltage amplitude characteristics 300b in voltage command amplitude (VA#) required for obtaining the same fundamental amplitude and in voltage command amplitude (VA) corresponding to the change point, similarly to the case of (K=9) shown in FIG. 8. Further, when synchronization number K varies, voltage command amplitude (VA) corresponding to the change point varies in each of the cases where the harmonic is present and it is absent, respectively.

Referring to FIG. 5 again, a map 271 has stored the voltage amplitude characteristic maps shown in FIG. 7 for different values of synchronization number K, and particularly the maps exhibited when the harmonic is absent. A map 272 has stored the voltage amplitude characteristic maps similar to those in FIG. 7, and particularly the maps which are prepared in advance for different values of synchronization number K and are exhibited when the harmonic is present.

Voltage amplitude correcting unit 270 reads the required voltage amplitude characteristics from maps 271 and 272 depending on synchronization number K provided from synchronous PWM control unit 280 and harmonic determination flag Shr provided from harmonic determining unit 300. Voltage amplitude correcting unit 270 calculates, according to the voltage amplitude characteristics thus read, voltage command amplitude VA# required for obtaining original voltage command amplitude VA as the fundamental amplitude, and calculates corrected d- and q-axis voltage commands Vd and Vq based on calculated voltage command amplitude VA#. Thereby, the linear compensation of d- and q-axis voltage commands Vd# and Vq# can be performed so that the fundamental amplitude of the pulse width modulation voltage can be linearly increased with respect to the linear increase in voltage command amplitude VA.

Then, the selection control of the presence/absence of the harmonic by harmonic determining unit 300 will be described below. First, description will be given on the overmodulation PWM control performed when the amplitude of the voltage applied to AC motor M1 is to be increased for increasing the output torque of the AC motor in response to acceleration request to the electric powered vehicle or the like.

In this case, the overmodulation PWM control is performed to change d- and q-axis voltage commands Vd# and Vq# so that voltage command amplitude VA may increase with increase in torque command value Trqcom. In this case, when voltage command amplitude VA changes to pass through changing points Pa(i) and Pb(i) on voltage amplitude characteristics 300a and 300b shown in FIGS. 8 and 9, respectively, the ratio of the corrected voltage command amplitude with respect to the fundamental voltage amplitude becomes discontinuous at a boundary defined by the above change point so that it may be feared that the control operation becomes unstable when the ratio passes through the boundary.

In the overmodulation PWM control according to the embodiment of the invention, therefore, the selection control for the presence/absence of the harmonic is executed as described below in view of the difference between the voltage command amplitudes corresponding to change points Pa(i) and Pb(i) on voltage amplitude characteristics described above.

Figure 10:
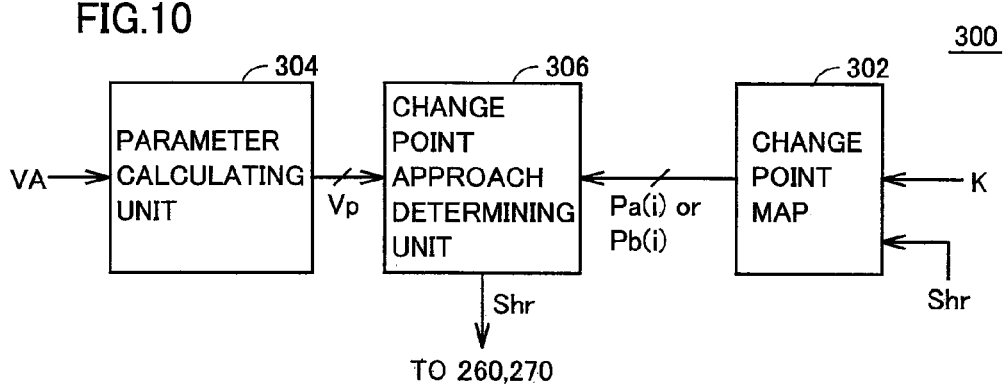
FIG. 10 is a functional block diagram illustrating a structure of the harmonic determining unit shown in FIG. 5.

FIG. 10 is a functional block diagram illustrating a structure of harmonic determining unit 300 shown in FIG. 5.

Referring to FIG. 10, harmonic determining unit 300 includes a change point map 302, a parameter calculating unit 304 and a change point approach determining unit 306.

Change point map 302 is employed for reading change points Pa(i) and Pb(i) illustrated in FIGS. 8 and 9 therefrom. More specifically, there are prepared maps (not shown) for reading out change points Pa(i) and Pb(i) according to voltage amplitude characteristics 300a and 300b for the each value of synchronization number K, and particularly for reading, based on synchronization number K, change point Pa(i) appearing when the harmonic is absent and change point Pb(i) appearing when the harmonic is present. According to change point map 302, change points Pa(i) and Pb(i) based on synchronization number K provided from synchronous PWM control unit 280 and currently appearing determination flag Shr.

Parameter calculating unit 304 receives original voltage command amplitude VA that is calculated by voltage amplitude calculating unit 245 in each control period of the overmodulation PWM control, and thereby generates a transition parameter Vp of voltage command amplitude VA. For example, transition parameter Vp includes at least a change direction (increase/decrease) and a present value of transition parameter Vp. Further, transition parameter Vp may include a change quantity of voltage command amplitude VA (i.e., change speed of VA) in a predetermined number of latest control periods.

Change point approach determining unit 306 produces determination flag Shr based on transition parameter Vp calculated by parameter calculating unit 304 and change points Pa(i) and Pb(i) read from change point map 302. Determination flag Shr is sent to PWM modulation unit 260 and voltage amplitude correcting unit 270.

Figure 11:
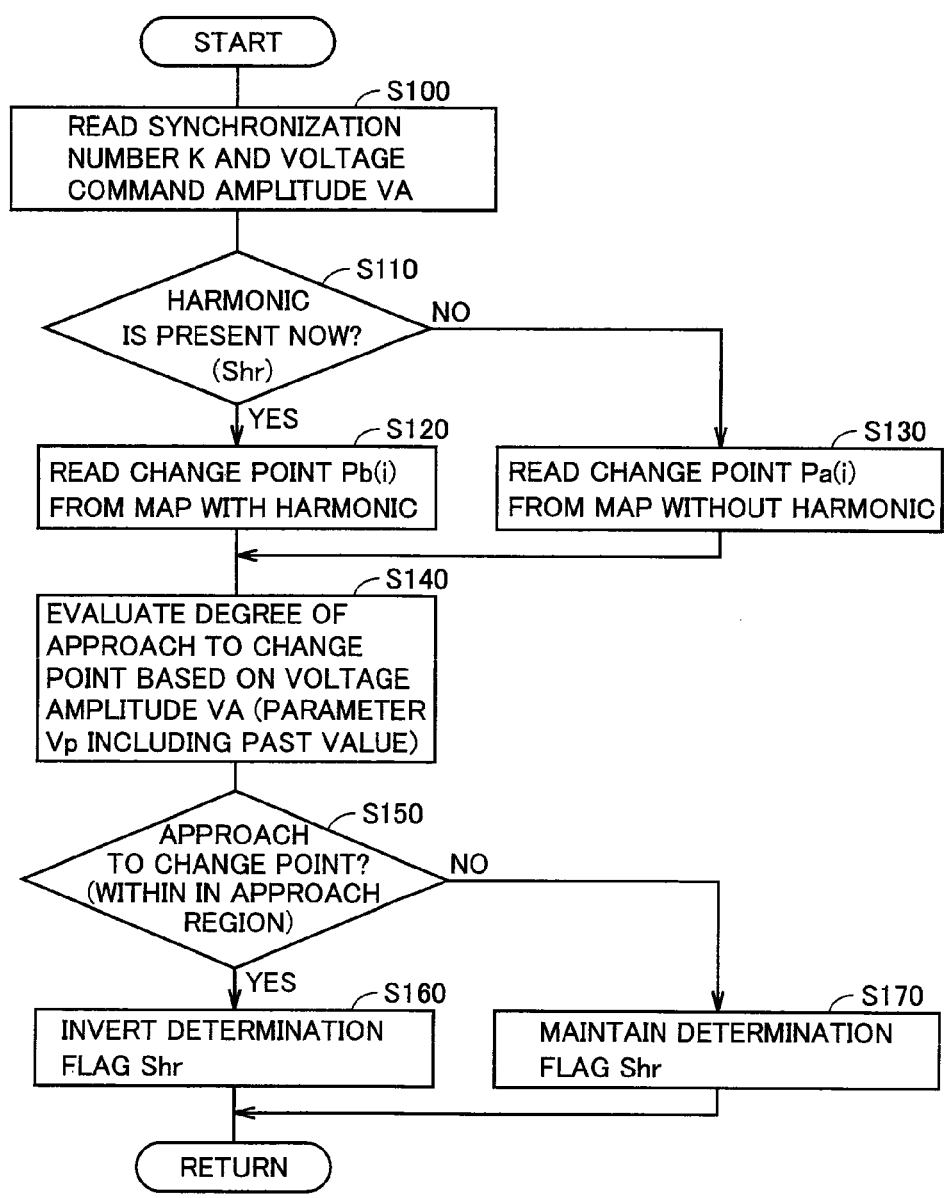
FIG. 11 is a flowchart illustrating control processing by the harmonic determining unit shown in FIG. 5.

FIG. 11 is a flowchart illustrating control processing by harmonic determining unit 300 shown in FIG. 10. The control processing according to the flowchart of FIG. 11 is executed in every control period to which the overmodulation PWM control is applied. Each step in the flowchart of FIG. 11 is implemented by software processing or hardware processing executed by control device 30.

Referring to FIG. 11, control device 30 (harmonic determining unit 300) reads, in a step S100, synchronization number K of the synchronous PWM as well as original voltage command amplitude VA based on original d- and q-axis voltage commands Vd# and Vq# by the current feedback control. Thus, the processing in step S100 corresponds to the function of reading the information into change point map 302 and parameter calculating unit 304 in FIG. 10.

In a step S110, control device 30 (harmonic determining unit 300) determines based on the present value of determination flag Shr whether the present overmodulation PWM control is performed with the harmonic or without it. When the overmodulation PWM control with the harmonic is executed (YES in step S110), control device 30 (harmonic determining unit 300) reads change point Pb(i) based on synchronization number K from the map with the harmonic stored in change point map 302 in a step S120. When the overmodulation PWM control without the harmonic is executed (NO in step S110), control device 30 (harmonic determining unit 300) reads change point Pa(i) based on synchronization number K from the map without the harmonic in a step S130.

Further, control device 30 (harmonic determining unit 300) evaluates a degree of approach to the change point based on transition parameter Vp) including a past value of voltage command amplitude VA.

Figure 12:
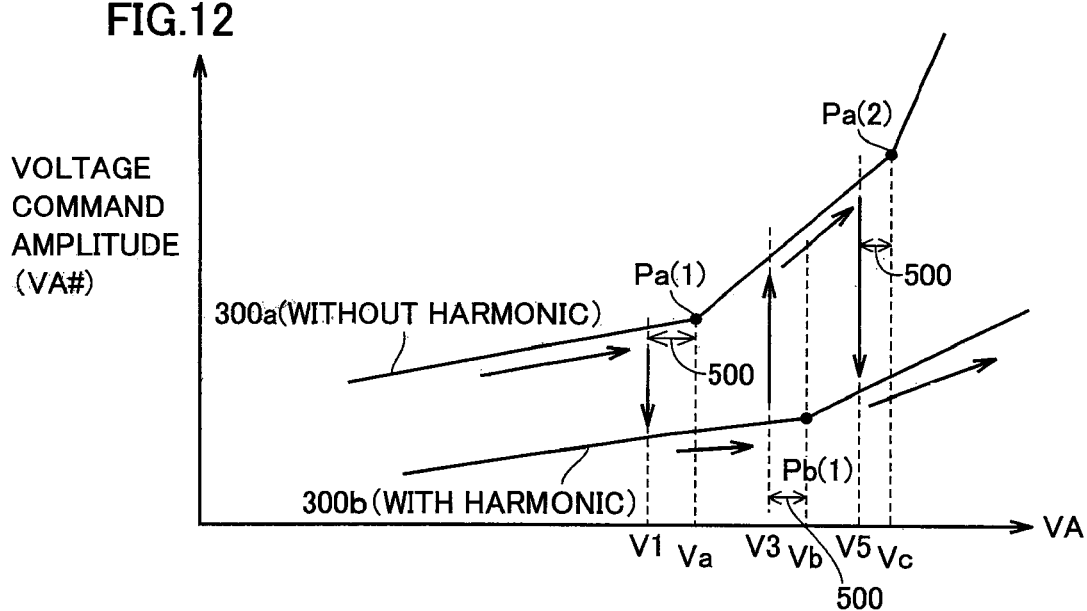
FIG. 12 shows a first operation example of selection control about presence/absence of the three-order harmonic in the overmodulation PWM control according to the embodiment.

For example, as illustrated in FIG. 12, the degree of approach to change point Pa(1) can be determined based on a difference between a voltage command amplitude Va corresponding to change point Pa(1) and voltage command amplitude VA. When VA is smaller than Va and VA is increasing, a determination voltage V1 lower than Va by a predetermined voltage is set, and a voltage range of (V1<VA≦Va) is set as an approach region 500. When voltage command amplitude VA enters approach region 500, the determination result in a step S150 is YES. Otherwise, the determination result in step S150 is NO. Approach region 500 may be set only on one side of the change point or on the opposite sides of the change point depending on the change direction of present voltage command amplitude. The range of approach region 500 can be variable depending on the change speed of voltage command amplitude VA and, for example, may be expanded when the change is rapid.

Returning to FIG. 11, control device 30 (harmonic determining unit 300) inverts determination flag Shr in a step S160 when voltage command amplitude VA is approaching change point Pa(i) or Pb(i) (YES in S150). Thus, when the overmodulation PWM control with the harmonic is executed, the control changes to the overmodulation PWM control without the harmonic. When the overmodulation PWM control without the harmonic is executed, the control changes to the overmodulation PWM control with the harmonic.

When voltage command amplitude VA is not approaching change point Pa(i) or Pb(i) (NO in S150), control device 30 (harmonic determining unit 300) performs next processing in a step S170 to maintain the present value of determination flag Shr. Consequently, the present state of the presence/absence of the harmonic is maintained in the overmodulation PWM control.

Figure 13:
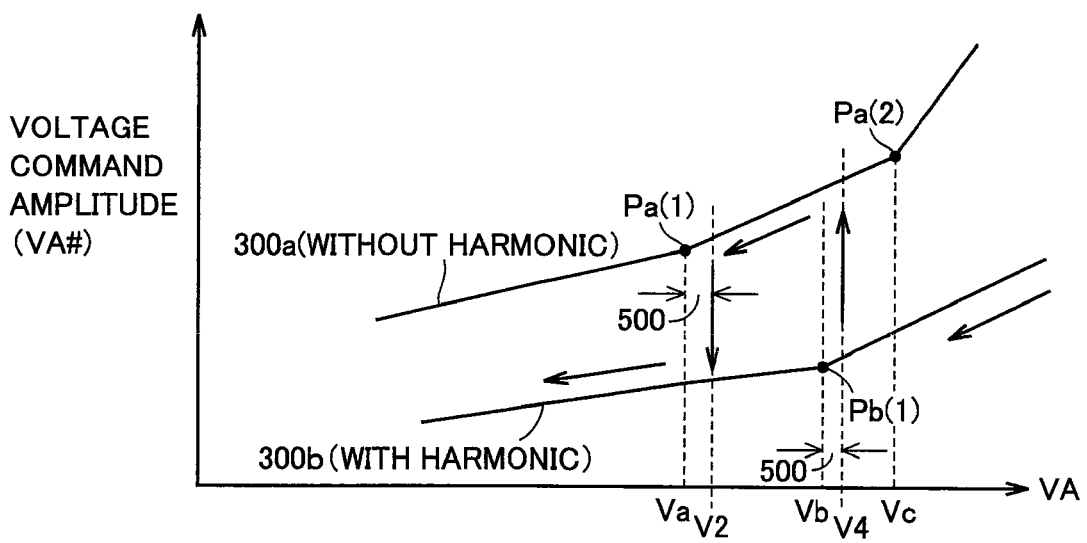
FIG. 13 shows a second operation example of the selection control about presence/absence of the three-order harmonic in the overmodulation PWM control according to the embodiment.

FIGS. 12 and 13 show an operation example of the selection control for the presence/absence of the harmonic shown in FIGS. 10 and 11.

Referring to FIG. 12, it is assumed that voltage command amplitude VA gradually increases from the region of (VA<VD. In this case, approach region 500 is set in a certain range around voltage command amplitude Va corresponding to change point Pa(1) appearing when the harmonic is absent. At a boundary of approach region 500 of change point Pa(1), VA is equal to V1. As described above, the range of approach region 500 can be variable depending on the change direction or change speed of voltage command amplitude VA.

When VA becomes larger than V1 and voltage command amplitude VA enters approach region 500, the overmodulation PWM control is switched from the control without the harmonic to the control with the harmonic, using the fact that change point Pb(i) is not present near Va according to voltage amplitude characteristics 300b, so that voltage command amplitude VA may not pass through change point Pa(1).

Further, under the overmodulation PWM control with the harmonic, when voltage command amplitude VA increases from V1, it is then determined whether VA has entered approach region 500 set within a certain range around a voltage command amplitude Vb corresponding to change point Pb(1) that is set when the harmonic is present, or not. A boundary of approach region 500 of change point Pb(1) is defined by (VA=V3).

When VA is equal to or smaller than V3, the overmodulation PWM control with the harmonic is maintained. When VA exceeds V3 and voltage command amplitude VA enters approach region 500, the overmodulation PWM control is switched from the control with the harmonic to the control without it conversely to the foregoing case, so that voltage command amplitude VA may not pass through change point Pb(1). This is because change point Pa(i) is not present near Vb according to voltage amplitude characteristics 300a.

When voltage command amplitude VA further rises from V3 under the control of the overmodulation PWM control without the harmonic, it is then determined whether VA has entered approach region 500 set in a certain range around a voltage command amplitude Vc corresponding to change point Pa(2) without the harmonic, or not. The boundary of approach region 500 of change point Pa(2) is defined by (VA=V5). When VA is equal to or smaller than V5, the overmodulation PWM control without the harmonic is maintained. When VA exceeds V5 and voltage command amplitude VA enters approach region 500, the overmodulation PWM control is switched from the control without the harmonic to the control with it again, so that voltage command amplitude VA may not pass through change point Pa(2).

As described above, by appropriately performing switching between the control without the harmonic and the control with it, the overmodulation PWM control corresponding to the increase of voltage command amplitude VA is performed without passing through change points Pa(i) and Pb(i) on voltage amplitude characteristics 300a and 300b, and can be stable.

In FIG. 13, it is assumed that voltage command amplitude VA gradually decreases without the harmonic in contrast to FIG. 12.

Referring to FIG. 13, it is assumed that the control with the harmonic is performed, and voltage command amplitude VA gradually decreases from the region of (VA>Vc). In this case, approach region 500 is set within a certain range around voltage command amplitude Vb corresponding to change point Pb(1) appearing when the harmonic is present. In this case, the boundary of approach region 500 is set by (VA=V4).

When VA becomes smaller than V4 and voltage command amplitude VA enters approach region 500, the overmodulation PWM control is switched from the control with the harmonic to that without the harmonic so that voltage command amplitude VA may not pass through change point Pb(1), because change point Pb(i) on voltage amplitude characteristics 300a is not present near Vb.

When voltage command amplitude VA further decreases from V4 under the control of overmodulation PWM control without the harmonic, it is then determined whether VA has entered approach region 500 that is set within a certain range around voltage command amplitude Va corresponding to change point Pa(1) appearing when the harmonic is absent. In this case, the boundary of approach region 500 is set by (VA=V2).

When VA is equal to or larger than V2, the overmodulation PWM control without the harmonic is maintained. When VA becomes smaller than V2 and voltage command amplitude VA enters approach region 500, the overmodulation PWM control is switched from the control without the harmonic to the control with it conversely to the foregoing case, so that voltage command amplitude VA may not pass through change point Pa(1). This is because change point Pb(i) is not present near Va according to voltage amplitude characteristics 300a.

As described above, by appropriately performing switching between the control with harmonic and the control without it, the overmodulation PWM control corresponding to the decrease of voltage command amplitude VA can be performed without passing through change points Pa(i) and Pb(i) on voltage amplitude characteristics 300a and 300b, and can be stable.

According to the overmodulation PWM control of the embodiment of the invention, the control with the harmonic and the control without it can selected to avoid the execution of the linear compensation of the voltage command amplitude by passing through change points Pa(i) and Pb(i) on voltage amplitude characteristics 300a and 300b. Therefore, in the overmodulation PWM control, it is possible to prevent the unstable control operation, which may be caused by the influence of the linear compensation of the voltage command amplitude performed for obtaining the fundamental amplitude of pulse width modulation voltage 180 matching the original voltage command amplitude.

[Modification]

In the overmodulation PWM control according to the embodiment of the invention described above, the selective control with/without the harmonic prevents the rapid change of the linear compensation in the voltage amplitude correction. However, the switching between the control with the harmonic and the control without it significantly changes the amplitude of three-order harmonic component 172 (FIG. 6), i.e., the waveform of the phase voltage command. Therefore, a modification of the embodiment will be described in connection with a control structure that can prevent rapid change due to the influence of the harmonic.

Figure 14:
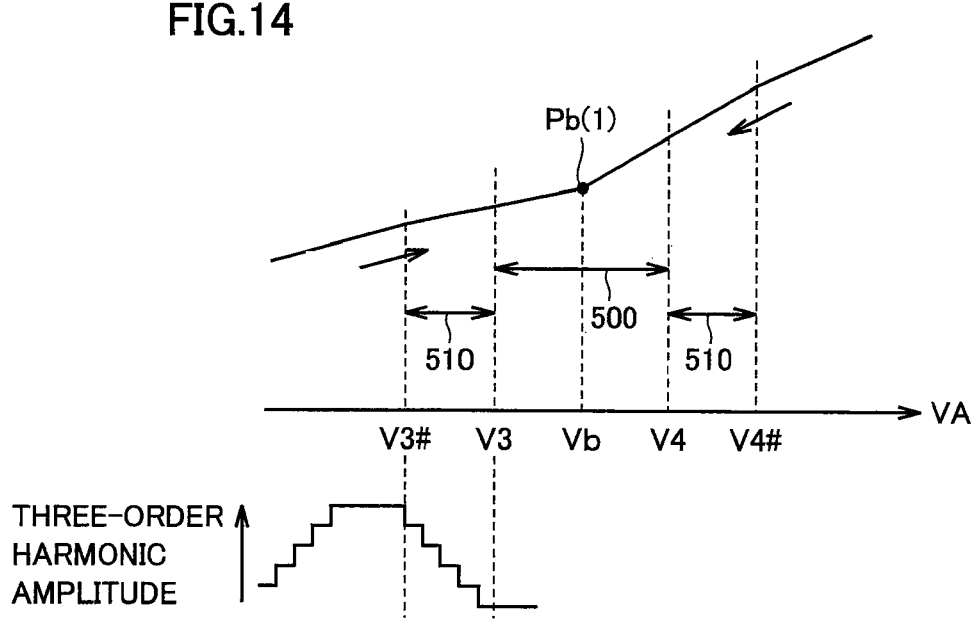
FIG. 14 is a conceptual diagram illustrating a concept of the amplitude control of the three-order harmonic component in the overmodulation PWM control according to a modification of the embodiment.

FIG. 14 illustrates a concept of the amplitude control of the three-order harmonic component in the overmodulation PWM control according to the modification of the embodiment.

Referring to FIG. 14, approach region 500 (V3<VA<V4) illustrated in FIGS. 12 and 13 is set with respect to change point Pb(1) on voltage amplitude characteristics 300b with the harmonic. As described above, when voltage command amplitude VA enters approach region 500, the control is switched to the overmodulation PWM control without the harmonic.

In the modification of the embodiment, a preliminary approach region 510 is set outside approach region 500. For example, ranges from V3 to V3# (V3#<V3) and from V4 to V4# (V4#>V4) are set as preliminary approach region 510. The range of preliminary approach region 510 may change depending on the change direction and change speed of voltage command amplitude VA.

When voltage command amplitude VA is outside approach region 500 and the overmodulation PWM control with the harmonic is maintained, harmonic determining unit 300 (FIG. 5) determines whether voltage command amplitude VA is in preliminary approach region 510 or not. When voltage command amplitude VA is in preliminary approach region 510, harmonic determining unit 300 gradually decreases, in every control period, the amplitude of three-order harmonic component 172 (FIG. 6) to be superimposed on the phase voltage command. When voltage command amplitude VA is not in preliminary approach region 510, harmonic determining unit 300 gradually increases, in every control period, the amplitude of three-order harmonic component 172. However, the increase in amplitude of three-order harmonic component 172 is restricted to a predetermined upper limit. For example, this upper limit is equal to the amplitude of harmonic component 172 that is estimated in the embodiment controlling only the presence and absence of the harmonic.

Figure 15:
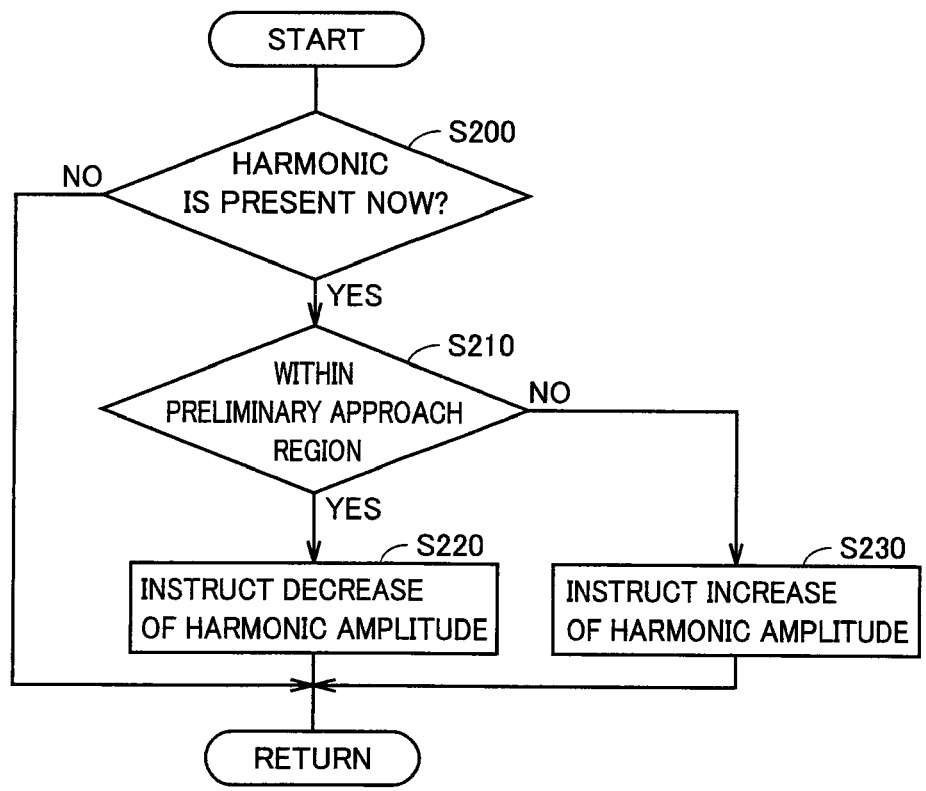
FIG. 15 is a flowchart illustrating the amplitude control of the three-order harmonic component in the overmodulation PWM control according to the modification of the embodiment.

FIG. 15 is a flowchart illustrating the control processing procedure for implementing the amplitude control of the three-order harmonic component shown in FIG. 14, The control processing according to the flowchart of FIG. 15 is executed in every control period to which the overmodulation PWM control is applied. Each step in the flowchart of FIG. 15 is implemented by software processing or hardware processing executed by control device 30.

Referring to FIG. 15, control device 30 (harmonic determining unit 300) determines from determination flag Shr whether the harmonic is present according to the present setting or not, in a step S200. When the harmonic is absent (NO in S200), the subsequent processing is skipped.

When the harmonic is present (YES in S200), the process proceeds to a step S210, in which harmonic determining unit 300 determines whether voltage command amplitude VA is in preliminary approach region 510 or not. As described before, preliminary approach region 510 may be relatively increased when the change speed of voltage command amplitude VA is high.

When present voltage command amplitude VA is outside preliminary approach region 510 (NO in S210), control device 30 (harmonic determining unit 300) produces an instruction for increasing the present three-order harmonic amplitude by one level. When the three-order harmonic amplitude has already reached a predetermined upper limit, the above increase instruction is not produced.

When present voltage command amplitude VA is in preliminary approach region 510 (YES in S210), control device 30 (harmonic determining unit 300) produces an instruction for decreasing the present three-order harmonic amplitude by one level. When the three-order harmonic amplitude is already zero, the above decrease instruction is not produced.

The impedance increase/decrease instructions for the amplitude in steps S220 and S230 are provided from harmonic determining unit 300 to PWM modulation unit 260 in the structure shown in FIG. 5, similarly to determination flag Shr.

By controlling the three-order harmonic amplitude as described above, it is possible to suppress the influence that may exerted by the change in amplitude of the three-order harmonic when the switching between the presence/absence of the harmonic is performed for preventing the rapid change in linear compensation behavior for the voltage command amplitude. This can further stabilize the overmodulation PWM control according to the embodiment of the invention.

The embodiment has been described in connection with the overmodulation PWM control employing the synchronous PWM. However, it is not essential that the present invention is applied to the synchronous PWM for the following reason. Even when the overmodulation PWM control is executed without employing the synchronous PWM, change points similar to those in FIGS. 7 to 9 appear on the voltage amplitude correction maps, and these change points vary depending on the presence and absence of the harmonic. Therefore, for the confirmation, it is stated that, even in the overmodulation PWM control employing the synchronous PWM, the switching between the presence and absence of the harmonic can be controlled to avoid the passing of the voltage command amplitude through the change point, similarly to the embodiment and the modification thereof.

In the preferred example of the structure already described according to the embodiment, DC voltage generating unit 10# of the motor drive control system includes converter 12 for allowing the variable control of the input voltage (system voltage VH) applied to inverter 14. However, DC voltage generating unit 10# is not restricted to the illustrated structure of the embodiment, provided that it allows the variable control of the input voltage to inverter 14. It is not essential that the inverter input voltage is variable, and the invention can be applied to the structure in which DC power supply B directly provides its output voltage to inverter 14 (i.e., the structure not including converter 12).

Further, according to the embodiment, the AC motor that is a load of the motor drive control system is the permanent magnet motor mounted on the electric powered vehicle (the hybrid vehicle, electric vehicle or the like) for driving the vehicle. However, the invention can be applied to a structure that employs, as a load, an arbitrary AC motor used in a device other than the above.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The invention can be applied to the AC motor control employing the overmodulation PWM control.

The invention claimed is:
1. A control device for an AC motor receiving a voltage controlled by an inverter, comprising:
a current sensing unit for sensing a current flowing between said inverter and said AC motor; and
an overmodulation PWM control unit for controlling a pulse width modulation voltage provided from said inverter to said AC motor based on a voltage comparison between a phase voltage command having an amplitude exceeding a voltage amplitude of a carrier and said carrier, wherein
said overmodulation PWM control unit includes:
a voltage command producing unit for producing d- and q-axis voltage commands according to a deviation between a current command (Idcom, Iqcom) of said AC motor and an actual current based on a sensed value of said current sensing unit to eliminate said deviation,
a voltage amplitude calculating unit for calculating an original voltage command amplitude based on original d- and q-axis voltage commands produced by said voltage command producing unit,
a voltage amplitude correcting unit for correcting said d- and q-axis voltage commands such that a fundamental amplitude of said pulse width modulation voltage matches said original voltage command amplitude, and
a voltage command converting unit for converting the d- and q-axis voltage commands corrected by said voltage amplitude correcting unit to said phase voltage command;
said voltage amplitude correcting unit calculates a required correction rate with respect to said original voltage command amplitude according to preset voltage amplitude characteristics representing a relationship between said fundamental amplitude and a voltage command amplitude required for achieving said fundamental amplitude, and calculates the corrected d- and q-axis voltage commands based on the corrected voltage command amplitude produced by correcting said original voltage command amplitude according to the required correction rate;
said voltage amplitude characteristics include first and second amplitude characteristics being set independently of each other according to presence and absence of superimposition of a three-order harmonic component on said phase voltage command converted by said voltage command converting unit; and
said overmodulation PWM control unit further includes a harmonic determining unit for determining the presence and absence of the superimposition of the three-order harmonic component on said phase voltage command converted by said voltage command converting unit, based on said first and second amplitude characteristics and said original voltage command amplitude calculated by said voltage amplitude calculating unit.

2. The control device for the AC motor according to claim 1, wherein
said harmonic determining unit switches the control to the control without the superimposition of said three-order harmonic component when said original voltage command amplitude approaches, to a predetermined degree or more, a change point where linear characteristics of said required voltage command amplitude with respect to said fundamental amplitude becomes discontinuous on said first amplitude characteristics while the control with the superimposition of said three-order harmonic component is being performed, and switches the control to the control with the superimposition of said three-order harmonic component when said original voltage command amplitude approaches, to a predetermined degree or more, the change point on said second amplitude characteristics while the control without the superimposition of said three-order harmonic component is being performed.

3. The control device for the AC motor according to claim 2, wherein
said harmonic determining unit includes:
a change point storage unit for storing in advance said change point, on said first and second amplitude characteristics,
a transition degree calculating unit for calculating a transition degree representing a present value of said voltage command amplitude and a changing direction, and
an approach determining unit configured to change a present state about the presence and absence of the superimposition of said three-order harmonic component, based on said transition degree calculated by said transition degree calculating unit and said change point stored in said change point storage unit, when a difference between said original voltage command amplitude at the present time and the voltage amplitude corresponding to said change point is smaller than a first predetermined value.

4. The control device for the AC motor according to claim 3, wherein
said first predetermined value is variably set depending on the change speed of said original voltage command amplitude.

5. The control device for the AC motor according to claim 1, wherein
while the control with the superimposition of said three-order harmonic component is being maintained, said harmonic determining unit gradually increases the amplitude of said three-order harmonic component to a predetermined upper limit when a difference between said original voltage command amplitude and a voltage amplitude corresponding to a change point where linear characteristics of said required voltage command amplitude with respect to said fundamental amplitude becomes discontinuous on said first amplitude characters is larger than a second predetermined value, and gradually decreases the amplitude of said three-order harmonic component when said difference is equal to or smaller than said second predetermined value.

6. The control device for the AC motor according to claim 1, wherein
said overmodulation PWM control unit further includes a synchronous PWM control unit for synchronizing the phase of said phase voltage command provided from said voltage command converting unit with the phase of said carrier,
said synchronous PWM control unit synchronizes the phase of said phase voltage command with the phase of said carrier to determine variably a synchronization number that is a frequency of said carrier per period of said phase voltage command, according to a rotation speed of said AC motor, and
said first and second amplitude characteristics are set in advance corresponding to said synchronization number.

* * * * *

UNITED STATES PATENT AND TRADEMARK OFFICE
CERTIFICATE OF CORRECTION

| | |
|---|---|
| PATENT NO. | : 8,427,087 B2 |
| APPLICATION NO. | : 13/146338 |
| DATED | : April 23, 2013 |
| INVENTOR(S) | : Yamada |

It is certified that error appears in the above-identified patent and that said Letters Patent is hereby corrected as shown below:

In the Specifications:

In the section entitled Best Mode For Carrying Out The Invention, at column 8, line 16:
Delete "VII" and insert therefor --VH--;

at column 8, line 24:
Delete "VII" and insert therefor --VH--;

at column 11, line 31:
Delete "v-" and insert therefor --V- --;

at column 16, line 19:
Delete "(VA<VD" and insert therefor --(VA<V1)--.

Signed and Sealed this
Thirteenth Day of August, 2013

Teresa Stanek Rea
*Acting Director of the United States Patent and Trademark Office*